(12) United States Patent
Yukutake et al.

(10) Patent No.: US 10,516,332 B2
(45) Date of Patent: Dec. 24, 2019

(54) INDUCED VOLTAGE SUPPRESSION DEVICE, MOTOR SYSTEM, AND POWER CONVERSION SYSTEM

(71) Applicant: Hitachi Automotive Systems, Ltd., Hitachinaka-shi, Ibaraki (JP)

(72) Inventors: Seigo Yukutake, Hitachinaka (JP); Hideki Miyazaki, Hitachinaka (JP); Katsuhiro Hoshino, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/316,881

(22) PCT Filed: Jul. 4, 2017

(86) PCT No.: PCT/JP2017/024426
§ 371 (c)(1),
(2) Date: Jan. 10, 2019

(87) PCT Pub. No.: WO2018/030031
PCT Pub. Date: Feb. 15, 2018

(65) Prior Publication Data
US 2019/0238049 A1 Aug. 1, 2019

(30) Foreign Application Priority Data
Aug. 9, 2016 (JP) ................. 2016-156633

(51) Int. Cl.
*H02M 1/32* (2007.01)
*H02M 7/48* (2007.01)
(Continued)

(52) U.S. Cl.
CPC ............ *H02M 1/32* (2013.01); *H02M 7/219* (2013.01); *H02M 7/48* (2013.01); *H02P 6/12* (2013.01); *H02P 29/032* (2016.02)

(58) Field of Classification Search
CPC ............ H02M 1/32; H02M 7/42; H02M 7/48; H02M 7/487; H02M 7/219; H02M 7/757; H02M 7/77; H02M 2007/4822; H02P 6/12
See application file for complete search history.

(56) References Cited

U.S. PATENT DOCUMENTS 9,019,736 B2 * 4/2015 Lee ..................... H02M 7/5387
363/131
9,025,350 B2 * 5/2015 Gan ....................... H02M 7/49
361/18
(Continued)

FOREIGN PATENT DOCUMENTS

JP 2006-115667 A 4/2006
JP 2010-200490 A 9/2010
JP 2015-198503 A 11/2015

OTHER PUBLICATIONS

International Search Report (PCT/ISA/210) issued in PCT Application No. PCT/JP2017/024426 dated Oct. 3, 2017 with English translation (two (2) pages).
(Continued)

Primary Examiner — Yusef A Ahmed
Assistant Examiner — Shahzeb K Ahmad
(74) Attorney, Agent, or Firm — Crowell & Moring LLP

(57) ABSTRACT

In a case where a switching element of an inverter does not operate properly due to failure or the like, a three-phase short circuit cannot be made, and an induced voltage cannot be suppressed. An induced voltage suppression device is electrically connected to the three-phase wiring between the power converter and the motor, in parallel to the power converter. A rectification circuit including a three-phase diode bridge circuit. A DC voltage source including a capacitor. A voltage detection circuit detects a voltage of both ends of the DC voltage source. In a short circuit, when
(Continued)

a transistor of the voltage detection circuit is turned on, transistors are turned on to perform three-phase short-circuit operation to suppress an induced voltage of the motor. Since the induced voltage suppression device secures a DC voltage by the induced voltage of the motor as a drive source in a self-excited manner, it is possible to suppress the induced voltage even when an abnormality occurs in the power converter.

4 Claims, 6 Drawing Sheets

(51) Int. Cl.
*H02P 29/032* (2016.01)
*H02M 7/219* (2006.01)
*H02P 6/12* (2006.01)

(56) References Cited

U.S. PATENT DOCUMENTS

| | | | |
|---|---|---|---|
| 9,246,402 B2* | 1/2016 | Sakurai | H02M 7/217 |
| 2005/0047050 A1* | 3/2005 | Matsubara | H02H 7/0838 |
| | | | 361/118 |
| 2009/0251831 A1* | 10/2009 | Shiba | B60L 3/003 |
| | | | 361/30 |
| 2015/0280624 A1 | 10/2015 | Sotome | |
| 2016/0172963 A1* | 6/2016 | Gopinath | H02M 1/34 |
| | | | 363/53 |

OTHER PUBLICATIONS

Japanese-language Written Opinion (PCT/ISA/237) issued in PCT Application No. PCT/JP2017/024426 dated Oct. 3, 2017 (three (3) pages).

* cited by examiner

INDUCED VOLTAGE SUPPRESSION DEVICE, MOTOR SYSTEM, AND POWER CONVERSION SYSTEM

TECHNICAL FIELD

The present invention relates to an induced voltage suppression device, a motor system, and a power conversion system.

BACKGROUND ART

In recent years, electric vehicles and plug-in hybrid vehicles have become widespread. For these vehicles, a motor is used. The motor operates up to high rotation using a permanent magnet for the field. Although a motor equipped with such a permanent magnet does not require an exciting current, an induced voltage generated by the field of the permanent magnet increases in proportion to a rotation speed. Because of this phenomenon, when the motor rotates at a high rotation speed equal to or higher than a certain rotation speed, the generated induced voltage exceeds an output voltage of an inverter, and a method of suppressing the output voltage of the inverter by using weak field control by PWM control is used for control at high motor rotation.

In Patent Literature 1, a motor is PWM-driven in a normal state, but when any abnormality occurs in an inverter, by switching a three phase switching element from PWM driving to three-phase short circuit driving, a DC power supply voltage can be suppressed to a predetermined voltage range.

CITATION LIST

Patent Literature

PTL 1: JP 2015-198503 A

SUMMARY OF INVENTION

Technical Problem

In the above-described device disclosed in PTL 1, when a switching element of an inverter does not normally operate due to failure or the like, a three-phase short circuit cannot be performed, and an induced voltage cannot be suppressed.

Solution to Problem

An induced voltage suppression device according to a first aspect of the present invention is an induced voltage suppression device that operates using an induced voltage of a motor as a drive source. The induced voltage suppression device includes a DC voltage source which generates a DC drive voltage based on the induced voltage, a voltage detection circuit which detects the induced voltage, and a short circuit which performs a three-phase short circuit of the motor by using the drive voltage in a case where it is detected by the voltage detection circuit that the induced voltage exceeds a threshold. The induced voltage suppression device is electrically connected in parallel to an inverter circuit that drives the motor between the inverter circuit and the motor.

A motor system according to a second aspect of the present invention includes the induced voltage suppression device according to the first aspect and the motor.

A power conversion system according to a third aspect of the present invention includes the induced voltage suppression device according to the first aspect and the inverter circuit.

Advantageous Effects of Invention

According to the present invention, it is possible to suppress an induced voltage even when an abnormality occurs in an inverter.

DESCRIPTION OF EMBODIMENTS

First Embodiment

Figure 1:
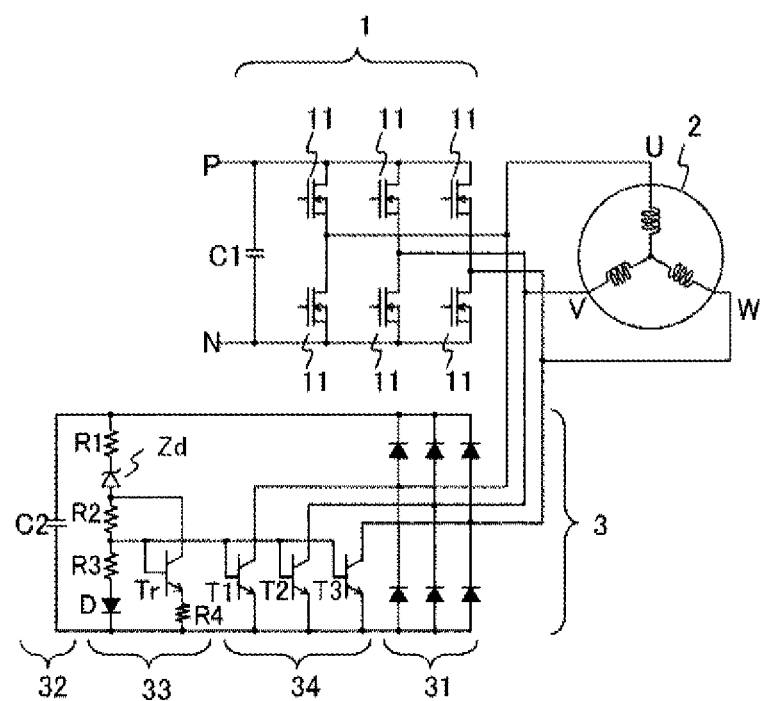
FIG. 1 is a circuit diagram of a motor control device according to a first embodiment.

FIG. 1 is a circuit diagram of a motor control device according to a first embodiment.

A power converter 1 includes an inverter circuit including six switching elements 11, the switching elements 11 called an upper arm and the switching elements 11 called a lower arm are connected in upper and lower series. The inverter circuit connects a winding of a motor 2 serving as a load to connection points of the upper and lower arms. The inverter circuit is connected to a battery (not illustrated) via a P terminal and an N terminal which are DC voltage terminals. A capacitor C1 is connected between the P terminal and the N terminal to stabilize a DC voltage of the inverter circuit.

In addition to the inverter circuit, the power converter 1 includes a control unit and a driving unit, although not illustrated. A current value from a current sensor (not illustrated) that detects a current supplied to a three-phase (U phase, V phase, W phase) winding of the motor 2 is fed back to the control unit, and the control unit performs current feedback control. The driving unit inputs a PWM driving signal to the switching elements 11 according to a driving signal from the control unit and turns on the upper and lower arms of the inverter circuit alternately to control a current flowing through the winding. The power converter 1 configured as described above performs power conversion between a direct current on the battery side and a three-phase alternating current on the motor 2 side.

The motor 2 is connected to the power converter 1 by the three-phase wiring and performs power running and regeneration. In the case where the power converter 1 and the motor 2 are an integral structure, that is, so-called machine-integrated, a form of wiring is not used, and for example, connection is performed using a connecting member called a bus bar.

An induced voltage suppression device 3 is electrically connected to the three-phase wiring between the power converter 1 and the motor 2, in parallel to the power converter 1. The induced voltage suppression device 3 includes a rectification circuit 31, a DC voltage source 32, a voltage detection circuit 33, and a short circuit 34.

The rectification circuit 31 is constituted by a three-phase diode bridge circuit and rectifies a three-phase AC voltage which is an induced voltage of the motor 2 into a DC voltage. The DC voltage source 32 is constituted by a capacitor C2 and accumulates the DC voltage rectified by the rectification circuit 31 as electric energy and generates a DC drive voltage by using the accumulated DC voltage. As a result, the induced voltage suppression device 3 operates with the induced voltage of the motor 2 as a drive source. The DC voltage source 32 is not limited to the capacitor C2 and may be anything as long as it accumulates electric energy.

In the voltage detection circuit 33, a Zener diode Zd, resistors R1, R2, and R3, and a diode D are connected in series to both ends of the DC voltage source 32. Furthermore, a collector of a transistor Tr is connected between the Zener diode Zd and the resistor R2, and a base of the transistor Tr is connected between the resistor R2 and the resistor R3. An emitter of the transistor Tr is connected to the capacitor C2 via a resistor R4. When a voltage applied to the Zener diode Zd exceeds a breakdown voltage due to the induced voltage of the motor 2 exceeding a predetermined threshold, a current flows, and the voltage detection circuit 33 detects a voltage by turning on the transistor Tr.

The short circuit 34 includes the transistors T1 to T3 connected to a three-phase wiring, and when the transistor Tr of the voltage detection circuit 33 is turned on, the transistors T1 to T3 are turned on to perform three-phase short-circuit operation to suppress an induced voltage of the motor 2. That is, when it is detected by the voltage detection circuit 33 that the induced voltage exceeds a threshold, the short circuit 34 performs a three-phase short circuit of the motor 2 using a drive voltage from the DC voltage source 32.

The circuit examples of the rectification circuit 31, the DC voltage source 32, the voltage detection circuit 33, and the short circuit 34 are merely examples, and similar functions may be realized by other circuit configurations.

In the present embodiment, the induced voltage suppression device 3 is provided separately from the power converter 1, and the induced voltage suppression device 3 secures a DC voltage by an induced voltage of the motor 2 as a drive source in a self-excited manner. Therefore, even when a power source of a control system including the power converter 1 is lost or even when an abnormality occurs in the power converter 1, that is, even when driving of the power converter 1 is stopped, the induced voltage can be suppressed to a desired voltage range. It is also possible to control such that a DC voltage of the power converter 1 does not exceed the upper limit voltage defined by safety standards and the like.

Second Embodiment

Figure 2:
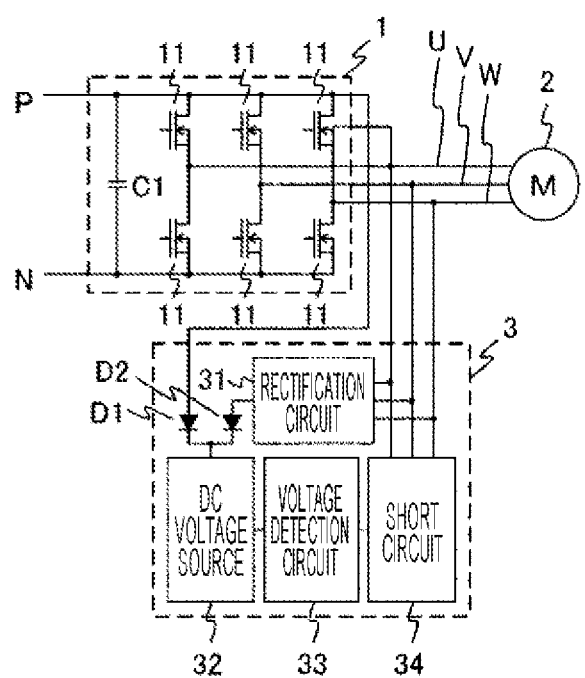
FIG. 2 is a circuit diagram of a motor control device according to a second embodiment.

FIG. 2 is a circuit diagram of a motor control device according to a second embodiment. In FIG. 2, the same reference numerals are given to the same parts as those in FIG. 1 described in the first embodiment, and description thereof will be omitted. Similarly to FIG. 1, an induced voltage suppression device 3 includes a rectification circuit 31, a DC voltage source 32, a voltage detection circuit 33, and a short circuit 34.

In FIG. 2, a voltage from a P terminal of a power converter 1 and a voltage from the rectification circuit 31 are OR-coupled through a diode D1 and a diode D2 respectively and input to the DC voltage source 32.

A voltage on a higher potential side between a DC voltage from the rectification circuit 31 in the induced voltage suppression device 3 and a DC voltage from the power converter 1 is selected by the diodes D1 and D2 and is applied to the DC voltage source 32. The DC voltage source 32 accumulates one of the applied DC voltages and generates a drive voltage as a driving source of the induced voltage suppression device 3. Therefore, the induced voltage suppression device 3 operates normally even if some trouble occurs in one of the DC voltage sources.

In the present embodiment, even if some abnormality occurs in a DC voltage from the rectification circuit 31 in the induced voltage suppression device 3, a drive source of the induced voltage suppression device 3 is ensured, and overvoltage due to an induced voltage of the motor 2 can be suppressed. In addition, it is possible to suppress the induced voltage even when an abnormality occurs in the power converter 1.

Third Embodiment

Figure 3:
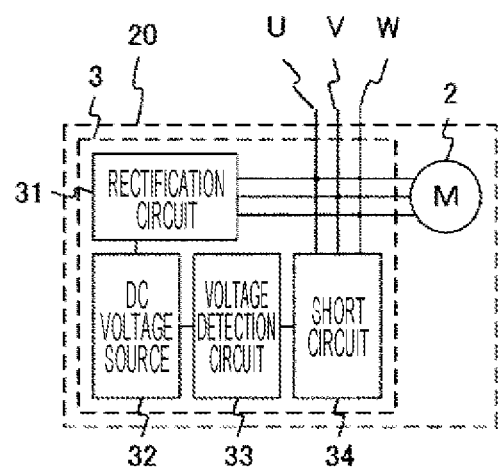
FIG. 3 is a circuit diagram of a motor system according to a third embodiment.

FIG. 3 is a circuit diagram of a motor system according to a third embodiment. In FIG. 3, the same reference numerals are given to the same parts as those in FIG. 1 described in the first embodiment, and the description thereof will be omitted. Similarly to FIG. 1, an induced voltage suppression device 3 includes a rectification circuit 31, a DC voltage source 32, a voltage detection circuit 33, and a short circuit 34.

FIG. 3 shows a motor system 20 in which the induced voltage suppression device 3 is integrally incorporated with a motor 2. The induced voltage suppression device 3 is integrated with the motor 2 to constitute the motor system 20, for example, by providing the induced voltage suppression device 3 in a three-phase AC terminal box of the motor 2 or a wire end connection portion of a coil end. The motor system 20 is provided in a housing enclosing the motor 2, and a three-phase wiring is drawn out from the housing and connected to the power converter 1 (not illustrated).

According to the present embodiment, by incorporating the induced voltage suppression device 3 in the motor system 20 together with the motor 2, even when the induced voltage suppression device 3 is connected to the power converter 1 having no induced voltage suppression function, an induced voltage can be suppressed to a desired voltage range. In addition, it is possible to suppress an induced voltage even when an abnormality occurs in the connected power converter 1.

Fourth Embodiment

Figure 4:
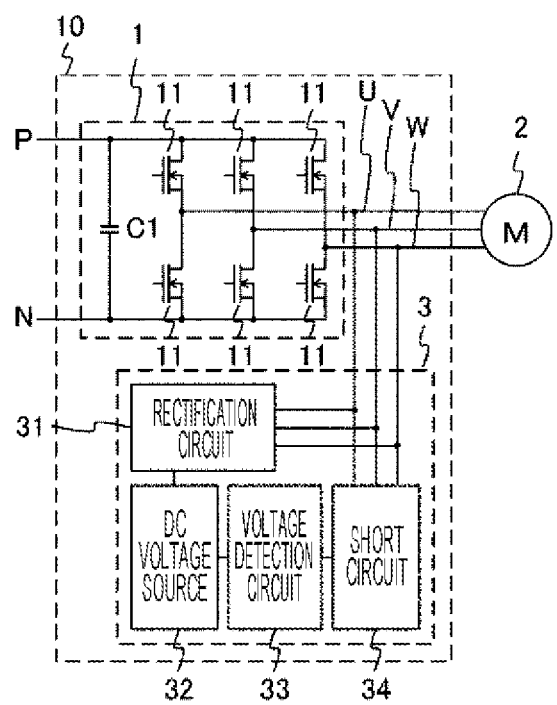
FIG. 4 is a circuit diagram of a power conversion system according to a fourth embodiment.

FIG. 4 is a circuit diagram of a power conversion system according to a fourth embodiment. In FIG. 4, the same reference numerals are given to the same parts as those in FIG. 1 described in the first embodiment, and description thereof will be omitted. Similarly to FIG. 1, an induced voltage suppression device 3 includes a rectification circuit 31, a DC voltage source 32, a voltage detection circuit 33, and a short circuit 34.

FIG. 4 illustrates a power conversion system 10 in which the induced voltage suppression device 3 is integrated with a power converter 1. The induced voltage suppression device 3 is connected to the three-phase wiring output from the power converter 1 and integrated with the power converter 1 in the power conversion system 10, and a three-phase wiring thereof is connected to a motor 2.

In the present embodiment, since the induced voltage suppression device 3 is integrated with the power converter 1 in the power conversion system 10, even when the power converter 1 does not have an induced voltage suppression function, an induced voltage can be suppressed to a desired voltage range. In addition, when the power converter 1 has an induced voltage suppression function, even when the power converter 1 fails, an induced voltage can be suppressed to a desired voltage range.

Fifth Embodiment

Figure 5:
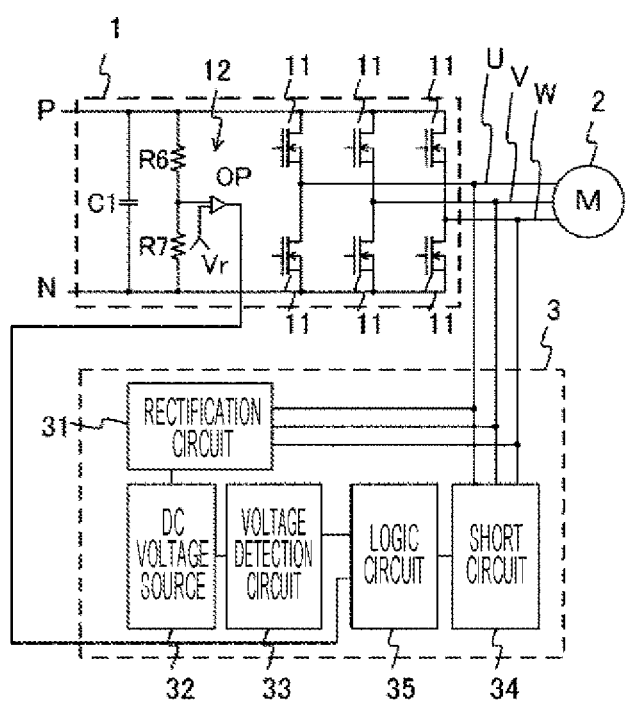
FIG. 5 is a circuit diagram of a motor control device according to a fifth embodiment.

FIG. 5 is a circuit diagram of a motor control device according to a fifth embodiment. In FIG. 5, the same reference numerals are given to the same parts as those in FIG. 1 described in the first embodiment, and description thereof will be omitted. Similarly to FIG. 1, an induced voltage suppression device 3 includes a rectification circuit 31, a DC voltage source 32, a voltage detection circuit 33, and a short circuit 34, and further includes a logic circuit 35.

In the present embodiment, as illustrated in FIG. 5, an overvoltage detection circuit 12 for detecting an overvoltage of a power converter 1 is provided. In the overvoltage detection circuit 12, a resistor R6 and a resistor R7 for dividing a voltage between both terminals are provided between a P terminal and an N terminal of the power converter 1, and the divided voltage and a reference voltage Vr are compared by a comparator OP. By applying an induced voltage of the motor 2 to the P terminal via a freewheeling diode (not illustrated) provided in parallel with a switching element 11, when a voltage of the P terminal rises, and the power converter 1 becomes overvoltage, an output of the comparator OP is input to the logic circuit 35 of the induced voltage suppression device 3.

The induced voltage suppression device 3 includes the logic circuit 35 between the voltage detection circuit 33 and the short circuit 34. The logic circuit 35 operates the short circuit 34 when a signal from the voltage detection circuit 33 or a signal from the overvoltage detection circuit 12 is input. That is, when an overvoltage of the power converter 1 due to an induced voltage of the motor 2 is detected, the induced voltage suppression device 3 causes the short circuit 34 to perform a three-phase short circuit of the motor 2 in response to detection of the overvoltage. Thereby the induced voltage is suppressed to a desired voltage range.

According to the present embodiment, even if the voltage detection circuit 33 of the induced voltage suppression device 3 cannot normally operate due to some abnormality, it is possible to suppress an overvoltage due to an induced voltage by detecting an overvoltage of the power converter 1. In addition, it is possible to suppress the induced voltage even when an abnormality occurs in the power converter 1.

In the first to fifth embodiments described above, the induced voltage suppression device 3 for suppressing an induced voltage of the motor 2 has been described. Factors that increase an induced voltage of the motor 2 will be described below.

Figure 6:
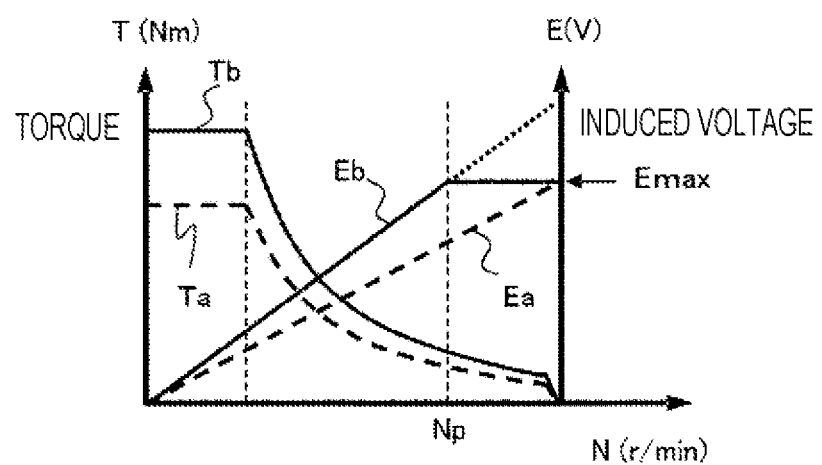
FIG. 6 is a diagram indicating characteristics of a motor.

FIG. 6 is a diagram indicating characteristics of the motor 2. In this figure, the horizontal axis indicates a rotation speed N of the motor 2, and the vertical axis indicates a torque T and an induced voltage E of the motor 2. FIG. 6 indicates how the torque T and the induced voltage E change when a magnet amount of the motor 2 is increased for the purpose of increasing a torque of the motor 2.

In FIG. 6, a change in the torque T before increasing the magnet amount of the motor 2 is indicated by a broken line Ta, and a change in the induced voltage E is indicated by a broken line Ea. Before increasing the magnet amount of the motor 2, the induced voltage E never exceeds an upper limit value Emax defined by the safety standard or the like.

In FIG. 6, a change in the torque T after increasing the magnet amount of the motor 2 is indicated by a solid line Tb, and the change in the induced voltage E is indicated by a solid line Eb. As the magnet amount is increased, the torque T rises as indicated by the solid line Tb, but the induced voltage E also rises. Therefore, there is a possibility that the induced voltage E exceeds the upper limit value Emax defined by the safety standard or the like in a high rotation range where the rotation speed N of the motor 2 exceeds a predetermined rotation speed Np. In order to suppress this, by the induced voltage suppression device 3 described in the first to fifth embodiments above, when the induced voltage E exceeds a threshold, a three-phase short circuit is performed such that the induced voltage E is controlled so as not to exceed the upper limit value Emax.

As described above, according to the first to fifth embodiments, even when the magnet amount is increased for the purpose of increasing the torque T of the motor 2, an induced voltage can be suppressed to a desired voltage range.

According to the above-described embodiments, the following effects can be obtained.

(1) The induced voltage suppression device 3 of the present invention operates using an induced voltage of the motor 2 as a drive source and includes a DC voltage source 32 for generating a DC drive voltage based on the induced voltage of the motor 2, a voltage detection circuit 33 for detecting the induced voltage of the motor 2, and a short circuit 34 which performs a three-phase short circuit of the motor 2 using the drive voltage from the DC voltage source 32 when it is detected by the voltage detection circuit 33 that the induced voltage exceeds a threshold. The induced voltage suppression device 3 is electrically connected in parallel to an inverter circuit that drives the motor 2 between the inverter circuit and the motor 2. This makes it possible to suppress the induced voltage even when an abnormality occurs in the inverter.

The present invention is not limited to the above-described embodiments. As long as characteristics of the present invention are not impaired, other embodiments envisaged within the scope of technical ideas of the preset invention are included in the scope of the present invention. Further, each of the above-described embodiments may be combined.

REFERENCE SIGNS LIST 1 power converter
2 motor
3 induced voltage suppression device
11 switching element
31 rectification circuit
32 DC voltage source
33 voltage detection circuit
34 short circuit
C1, C2 capacitor
Zd Zener diode
R1, R2, R3, R4, R6, R7 resistance
D diode
Tr, T1, T2, T3 transistor

The invention claimed is:
1. An induced voltage suppression device that operates using an induced voltage of a motor as a drive source, the induced voltage suppression device comprising:

a DC voltage source configured to generate a DC drive voltage based on the induced voltage;

a voltage detection circuit configured to detect the induced voltage;

a short circuit configured to perform a three-phase short circuit of the motor by using the drive voltage in a case where it is detected by the voltage detection circuit that the induced voltage exceeds a threshold;

a rectification circuit configured to rectify the induced voltage of the motor and output a DC voltage; and a selection circuit configured to select either the DC voltage from the rectification circuit or a DC voltage from the inverter circuit;

wherein the DC voltage source generates the drive voltage by accumulating a DC voltage from the rectification circuit, wherein the induced voltage suppression device is electrically connected in parallel to an inverter circuit that drives the motor between the inverter circuit and the motor, and wherein the DC voltage source generates the drive voltage by accumulating the DC voltage selected by the selection circuit.

2. The induced voltage suppression device according to claim 1, wherein the inverter circuit has an overvoltage detection circuit configured to detect an overvoltage of the inverter circuit by the induced voltage, and the short circuit performs a three-phase short circuit of the motor in response to detection of the overvoltage by the overvoltage detection circuit.

3. A motor system, comprising:

the induced voltage suppression device according to claim 1; and the motor.

4. A power conversion system, comprising:

the induced voltage suppression device according to claim 1; and the inverter circuit.

* * * * *